United States Patent

Fix et al.

[15] 3,704,832
[45] Dec. 5, 1972

[54] FLUID FLOW CONTROL APPARATUS

[72] Inventors: John W. Fix, Laguna Niguel; Charles E. Hallum, Irvine; Warren F. Kaufman, Santa Ana, all of Calif.

[73] Assignee: Philco-Ford Corporation, Philadelphia, Pa.

[22] Filed: Oct. 30, 1970

[21] Appl. No.: 85,510

[52] U.S. Cl. ................................239/461, 137/81.5
[51] Int. Cl. ................................................B05b 1/26
[58] Field of Search..............239/461, 443, 444, 447; 137/81.5

[56] References Cited

UNITED STATES PATENTS

| | | |
|---|---|---|
| 3,193,197 | 7/1965 | Bauer........................137/81.5 X |
| 3,282,279 | 11/1966 | Manion.......................137/81.5 |
| 3,311,120 | 3/1967 | Palmisano.................137/81.5 X |
| 3,439,772 | 4/1969 | Giraud......................137/81.5 X |
| 3,447,383 | 6/1969 | Camarata..................137/81.5 X |
| 3,486,517 | 12/1969 | Gaura........................137/81.5 |

*Primary Examiner*—M. Henson Wood, Jr.
*Assistant Examiner*—Thomas C. Culp, Jr.
*Attorney*—Carl H. Synnestvedt

[57] ABSTRACT

A fluidic thruster valve capable of operating in space, or other low pressure environments. The two passages of a supersonic bistable fluid amplifier lead, respectively, to a pair of reaction thrust nozzles, each in series flow connection with a vortex fluid amplifier. The tangential control nozzles of the vortex fluid amplifier are interconnected through a cross bleed duct, so as to limit leakage from the non-energized thrust nozzle.

6 Claims, 3 Drawing Figures

PATENTED DEC 5 1972

3,704,832

INVENTORS
JOHN W. FIX
CHARLES E. HALLUM
BY WARREN F. KAUFMAN

Harry W. Hargis III
AGENT

FLUID FLOW CONTROL APPARATUS

BACKGROUND OF THE INVENTION

This invention relates to fluid flow control apparatus, and especially to improvements in bistable fluid amplifiers.

A bistable fluid amplifier utilized in the thrust control of a missile or the like is sensitive to altitude, since it relies upon a predetermined pressure environment to achieve its selective flow characteristics. Consequently, performance of such a control is subject to degradation as pressures vary, from design conditions, in accordance with changes in altitude.

By way of example, a supersonic fluid amplifier thrust control may comprise a supersonic nozzle, a pair of flow control nozzles, and a pair of outlet passages. High pressure gaseous fluid, at near stagnation conditions, is expanded to a high velocity at the exit of the supersonic nozzle. The static pressure of the high velocity jet traversing the free stream boundary is designed to be equal to or less than the atmospheric pressure. Upon energization of a flow control nozzle the free stream is deflected and caused to lock onto an oppositely disposed wall of a passage and flow therethrough, since the static pressure of the fluid adjacent the wall is significantly lower than the free stream boundary pressure. This total deflection of the primary fluid flow to one outlet passage provides the desired directive thrust. If the thruster is operated at atmospheric pressures less than the free stream boundary pressure, primary fluid flow from the nozzle will be caused to leak to the "off" outlet passage. This leakage is undesirable, since it degrades the thrust efficiency, and at very low atmospheric pressures thrust neutralization may occur due to substantially equal flow through each outlet passage.

It is a general objective of this invention to provide a thrust control of the above described type whose operational characteristics are independent of its external pressure environment.

It is a further and more specific objective of the invention to provide a bistable fluid amplifier with means for automatically compensating for extreme variations in environmental pressure.

SUMMARY OF THE INVENTION

In achievement of the foregoing as well as other objectives, the invention contemplates a two-stage fluidic thruster comprising: a first stage including a fluid amplifier having an inlet nozzle, a pair of outlet passages terminating in thrust nozzles, and a pair of flow control ports associated with the inlet nozzle; and a second stage including a pair of vortex fluid amplifiers each interposed in one of said outlet passages upstream of a corresponding nozzle and interconnected through a cross bleed duct serving as the fluid supply line for the vortex control nozzle.

For a further understanding of the invention, and the manner in which the foregoing objectives and advantages may best be achieved, reference is made to the following description, taken in light of the accompanying drawing.

DESCRIPTION OF THE PREFERRED EMBODIMENT

Figure 1:
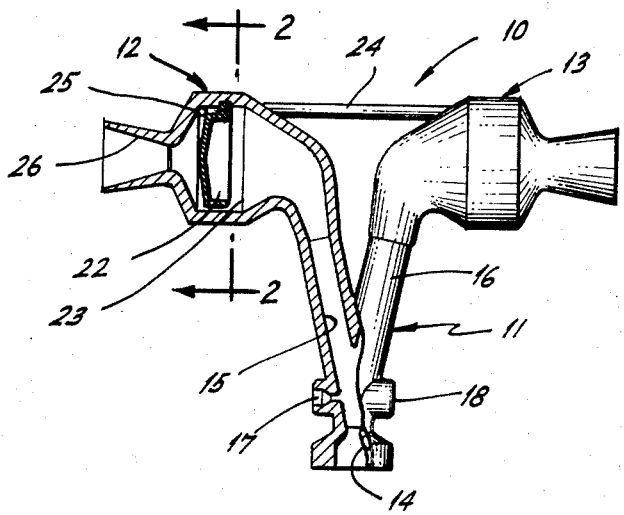
FIG. 1 is an elevational showing, partly in section and with parts broken away, illustrating fluidic thruster apparatus embodying the invention.

With reference to FIG. 1, fluidic thruster apparatus 10 comprises a first stage, supersonic fluid amplifier 11 and a pair of second stage, vortex fluid amplifiers 12, 13. The first stage 11 comprises an inlet, or primary, nozzle 14 for receiving gaseous fluid from a gas generator (not shown) operating at very high pressure, and effective to discharge fluid in a free jet region at supersonic velocity. A pair of control flow nozzles 17 and 18 are disposed opposite one another, and are directed transversely of the free jet region downstream of primary nozzle 14. A pair of symmetrically arranged supersonic diffusers 15 and 16 are positioned downstream of nozzle 13, and provide for fluid flow into each of the pair of identical second stages 12 and 13. In view of the identity of the stages, only the left hand one of the pair (i.e. stage 12) will be described in detail in connection with FIG. 1.

Figure 2:
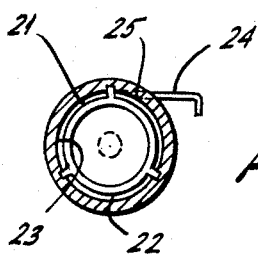
FIG. 2 is a sectional view of a portion of the device seen in FIG. 1, taken along the line indicated generally by the arrows 2—2.

With reference also to FIG. 2, second stage 12 comprises a vortex fluid amplifier having an annular inlet port 21 defined by the space between the confronting curved side wall of a generally disk-shaped member 22 and the generally cylindrical walls of a vortex chamber 23. A vortex-inducing bleed conduit 24 is provided with a tangential outlet port 25 in the region of member 22. The outlet port of the vortex fluid amplifier comprises a reaction thrust nozzle 26. As is seen further in FIG. 1 the vortex-inducing conduit 24 is common to both of the second stages 12 and 13, for reasons that will be more fully understood from the following description of the operation of the apparatus.

Figure 3:
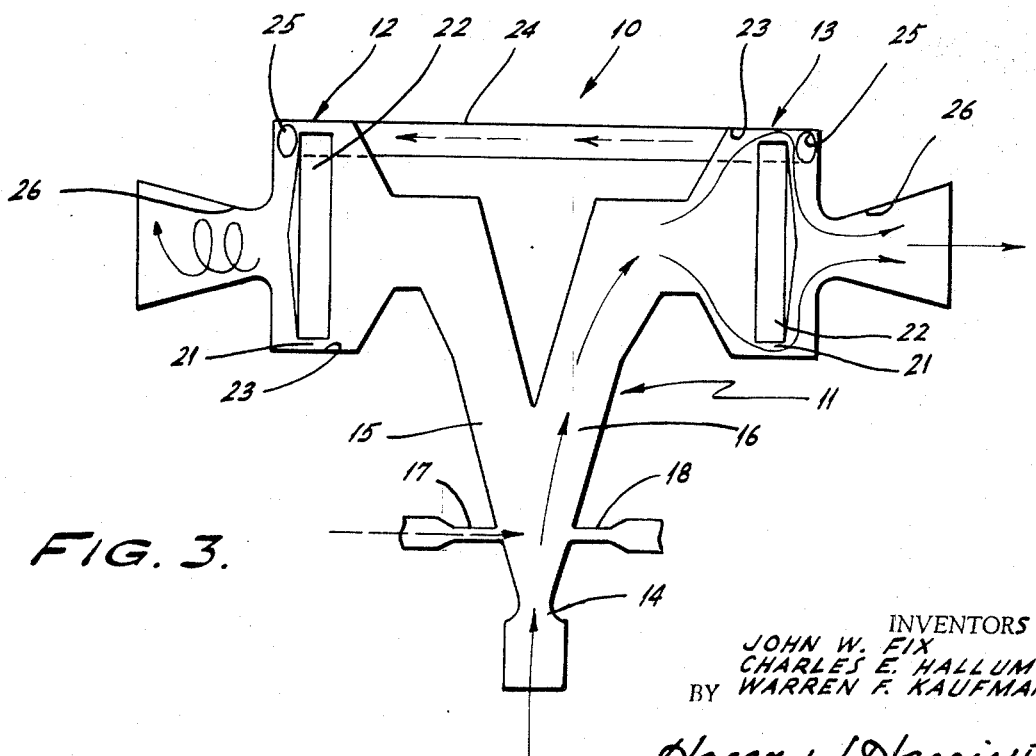
FIG. 3 is a somewhat diagrammatic showing of the device as illustrated in FIG. 1, and demonstrating operational features thereof.

In operation, and with reference to FIG. 3, in which corresponding elements of stages 12 and 13 are identified by like numerals, high pressure gaseous fluid is introduced into primary nozzle 14 in accordance with a solid flow arrow extending therethrough, and control flow nozzle 17 is energized (broken line arrow) to deflect the fluid stream issuing from nozzle 14 at supersonic velocity and cause it to flow into supersonic diffuser 16. The operation thus far described in accordance with well known principles as apply to bistable fluid amplifiers. Pressure recovery takes place in diffuser 16, and the fluid flows therefrom through the annular passage of the vortex fluid amplifier stage 13, thence outwardly through the supersonic reaction nozzle 26. A portion of the fluid flowing into vortex amplifier 13 is bled off from its port 25 for flow through conduit 24 (see broken line arrows) interconnecting vortex amplifiers 12 and 13. From conduit 24 this fluid enters the tangentially directed outlet port 25 of amplifier 12 to restrict flow through reaction nozzle 26 (see curved arrow) of fluid leaking through diffuser 15 from the deflected gas stream that is locked into flow through diffuser 16. The restriction to flow created by entry of fluid through port 25 is of course brought about in accordance with principles well known as applying to vortex fluid amplifiers. This restriction to gas flow by vortex amplifier 12 creates sufficient back pressure in diffuser 15 to maintain the deflected flow of gas through diffuser 16, since the free stream boundary pressure of gas issuing from nozzle 14 is matched by the back pressure.

Assuming that it is desired to transfer reaction thrust from right-hand nozzle 26 to left-hand nozzle 26, flow control nozzle 18 is energized instead of nozzle 17, and the free stream issuing from nozzle 14 is deflected to the left for locked-flow through diffuser 15, thence through vortex fluid amplifier 12. Operation is then the same as that described above, in connection with FIG. 3.

While selectivity of flow has been disclosed as being under the control of flow control nozzles as seen at 17 and 18, it will be understood that other means for switching flow may be used. For example, the control means may take the form of mechanical tabs injected into the free jet stream, or suitably positioned electrical spark discharge devices. Such devices are known, per se, in the art and are contemplated by the claiming.

It will be appreciated that the invention affords improved fluid thruster apparatus capable of operating over a relatively wide range of environmental pressures.

We claim:

1. In a fluid amplifier: a primary nozzle for discharging fluid at relatively high velocity; a pair of divergent passages arranged to receive fluid discharged by said primary nozzle; selectively operable means for deflecting the free stream issuing from said primary nozzle for flow through one of said passages of said pair; a vortex fluid amplifier in each of said passages and through which said fluid is discharged; and a bleed passage connecting the tangential control nozzles of said vortex fluid amplifiers in fluid flow communication.

2. A fluid amplifier according to claim 1, and characterized by the inclusion of a fluid flow nozzle in flow circuit with, and serving as the outlet for, each of said vortex fluid amplifiers.

3. A fluid amplifier according to claim 2, and further characterized in that each of said divergent passages comprises a supersonic diffuser, said primary nozzle is effective to discharge fluid at supersonic velocity and each said flow nozzle comprises a supersonic reaction nozzle.

4. A fluid amplifier according to claim 1, and further characterized in that said means for deflecting said stream comprises a pair of oppositely disposed nozzles directed toward one another and arranged to direct streams of control fluid transversely of said free stream.

5. A two-stage fluidic thruster apparatus particularly adapted for use in attitude control of a missile or the like at relatively high altitudes, said apparatus comprising: a first stage including a bistable fluid amplifier having an inlet nozzle, a pair of outlet passages each being disposed in fluid flow communication with a thrust nozzle, and a pair of flow control means associated with said inlet nozzle; and a second stage including a pair of vortex fluid amplifiers each interposed in one of said outlet passages upstream of one of said thrust nozzles, and including a fluid interconnection between the vortex control nozzles of said vortex fluid amplifiers.

6. Apparatus according to claim 5, and further characterized in that said pair of flow control means comprises a pair of oppositely disposed nozzles directed toward one another and arranged to direct streams of control fluid transversely of the stream as it flows outwardly of said inlet nozzle toward said outlet passages.

* * * * *